US012682773B2

(12) United States Patent
Lane et al.

(10) Patent No.: US 12,682,773 B2
(45) Date of Patent: Jul. 14, 2026

(54) DISTRIBUTED FLIGHT MANAGEMENT METHOD AND SYSTEM

(71) Applicant: Rockwell Collins, Inc., Cedar Rapids, IA (US)

(72) Inventors: Jesse A. Lane, Mount Pleasant, SC (US); Brian R. Wolford, Cedar Rapids, IA (US); Joshua A. Slagle, Marion, IA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 154 days.

(21) Appl. No.: 18/619,724

(22) Filed: Mar. 28, 2024

(65) Prior Publication Data

US 2025/0308394 A1 Oct. 2, 2025

(51) Int. Cl.

| | |
|---|---|
| ***G06G 5/00*** | (2006.01) |
| ***G08G 5/34*** | (2025.01) |
| ***G08G 5/56*** | (2025.01) |

(52) U.S. Cl.
CPC ................. *G08G 5/56* (2025.01); *G08G 5/34* (2025.01)

(58) Field of Classification Search
CPC ............... G08G 5/00; G08G 5/34; G08G 5/56
USPC .......................................................... 701/122
See application file for complete search history.

(56) References Cited

U.S. PATENT DOCUMENTS

| | | | |
|---|---|---|---|
| 9,824,593 B1 | 11/2017 | Kronfeld et al. | |
| 11,875,689 B2 * | 1/2024 | Tazume | G08G 5/727 |
| 2019/0114564 A1 * | 4/2019 | Ferguson | G06Q 10/06315 |
| 2021/0304626 A1 * | 9/2021 | Ubhi | G08G 5/34 |
| 2021/0327283 A1 | 10/2021 | Reed et al. | |
| 2025/0021103 A1 * | 1/2025 | Ham | G05D 1/1064 |
| 2025/0046199 A1 * | 2/2025 | Chen | G08G 5/26 |

FOREIGN PATENT DOCUMENTS

| | | |
|---|---|---|
| CN | 106774392 A | 5/2017 |
| CN | 108183770 A | 6/2018 |
| CN | 114442651 A | 5/2022 |
| CN | 115953919 A | 4/2023 |
| WO | 2023137285 A1 | 7/2023 |

* cited by examiner

*Primary Examiner* — Andrew Joseph Rudy
(74) *Attorney, Agent, or Firm* — Millen, White, Zelano & Branigan P.C.; William F. Nixon

(57) ABSTRACT

A unmanned aerial vehicle (UAV) includes a flight management system (FMS) that is in communication with other FMSs on other UAVs. The FMS includes a route manager that retrieves data from an avoidance source and determines an avoidance importance score for a route adjustment request based on the data. The route manager also determines a route complexity score for the request. A rerouter within the FMS compares the route complexity score for the request to a complexity threshold for the UAV. Based on the comparison, the rerouter forwards to the request to a rerouting client on the UAV or to the other UAVs via inter-application communication. If the request is sent to the other UAVs, then the processed new route is provided by the originating UAV.

20 Claims, 6 Drawing Sheets

DISTRIBUTED FLIGHT MANAGEMENT METHOD AND SYSTEM

FIELD OF THE INVENTION

The present invention relates to using distributed flight management functionality to allocate decision making during flight operations.

DESCRIPTION OF THE RELATED ART

Flight management systems and the associated functionality is deployed on a per platform basis. In other words, there may be one to one (1-1) correspondence between the platform and the flight management system (FMS). An FMS is "sized to fit" to the existing onboard computational resources and acts like a dedicated box to the platform. Each platform uses centralized information sources. Some systems may transfer FMS operations to the cloud via containerization, but these systems are designed for "as a service" operations. Resources are distributed yet decision making is still centralized. Significant size, weight, and power (SWaP) constraints may apply to such an arrangement.

Thus, current platforms have a need for providing better flight management systems that avoid the SWAP constraints but has access to additional information for making decisions.

SUMMARY OF THE INVENTION

A method is disclosed. The method includes determining an avoidance importance score by a route manager of a first flight management system for an unmanned aerial vehicle (UAV) for a need to reroute the UAV. The avoidance importance score is based on data from an avoidance source. The method also includes generating a route adjustment request for the UAV from the route manager based on the avoidance importance score. The method also includes determining a route complexity score based on associated data for the route adjustment request within the first flight management system. The method also includes comparing the route complexity score to a complexity threshold for the first flight management system by a rerouter of the first flight management system. The method also includes, based on the comparison, engaging an inter-application communication component connected to the first flight management system to forward the route adjustment request to the plurality of flight management systems over the network.

A system is disclosed. The system includes a plurality of unmanned aerial vehicles (UAV) connected to each other over a cloud network. Each UAV includes a flight management system configured to guide flight routes for the respective UAV. The flight management system includes a route manager configured to retrieve data from an avoidance source and determine an avoidance importance score for a route adjustment request based on the data. The route adjustment request results in at least one possible route for the respective UAV. The route manager also is configured to determine a route complexity score for the route adjustment request using associated data. The flight management system also includes a rerouter configured to provide a complexity threshold and to receive the route adjustment request and the route complexity score. The rerouter compares the route complexity score to the complexity threshold. The system also includes an inter-application communication component to transmit the route adjustment request if the route complexity score is greater than the complexity threshold. The system also includes a local rerouting client to process the route adjustment request if the route complexity score is below the complexity threshold.

An unmanned aerial vehicle (UAV) is disclosed. The UAV includes a flight management system. The flight management system includes a route manager configured to retrieve data from an avoidance source and determine an avoidance importance score for a route adjustment request based on the data. The route adjustment request results in at least one possible route for the respective UAV. The route manager also is configured to determine a route complexity score for the route adjustment request. The flight management system also includes a rerouter configured to provide a complexity threshold and to receive the route adjustment request and the route complexity score. The rerouter compares the route complexity score to the complexity threshold. The flight management system also includes an internal channel to exchange the data between the route manager and the rerouter. The UAV also includes an inter-application communication component to transmit the route adjustment request if the complexity score is greater than the complexity threshold. The UAV also includes a local rerouting client to process the route adjustment request if the complexity score is below the complexity threshold.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, numerous variations are possible. For instance, structural elements and process steps may be rearranged, combined, distributed, eliminated, or otherwise changed, while remaining with the scope of the disclosed embodiments.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and which some features may be exaggerated and some features may be omitted or may be represented schematically in the interest of clarity. Like reference numerals in the drawings may represent and refer to the same or similar element, feature, or function. In the drawings.

DETAILED DESCRIPTION OF THE PREFERRED EMBODIMENTS

Figure 1:
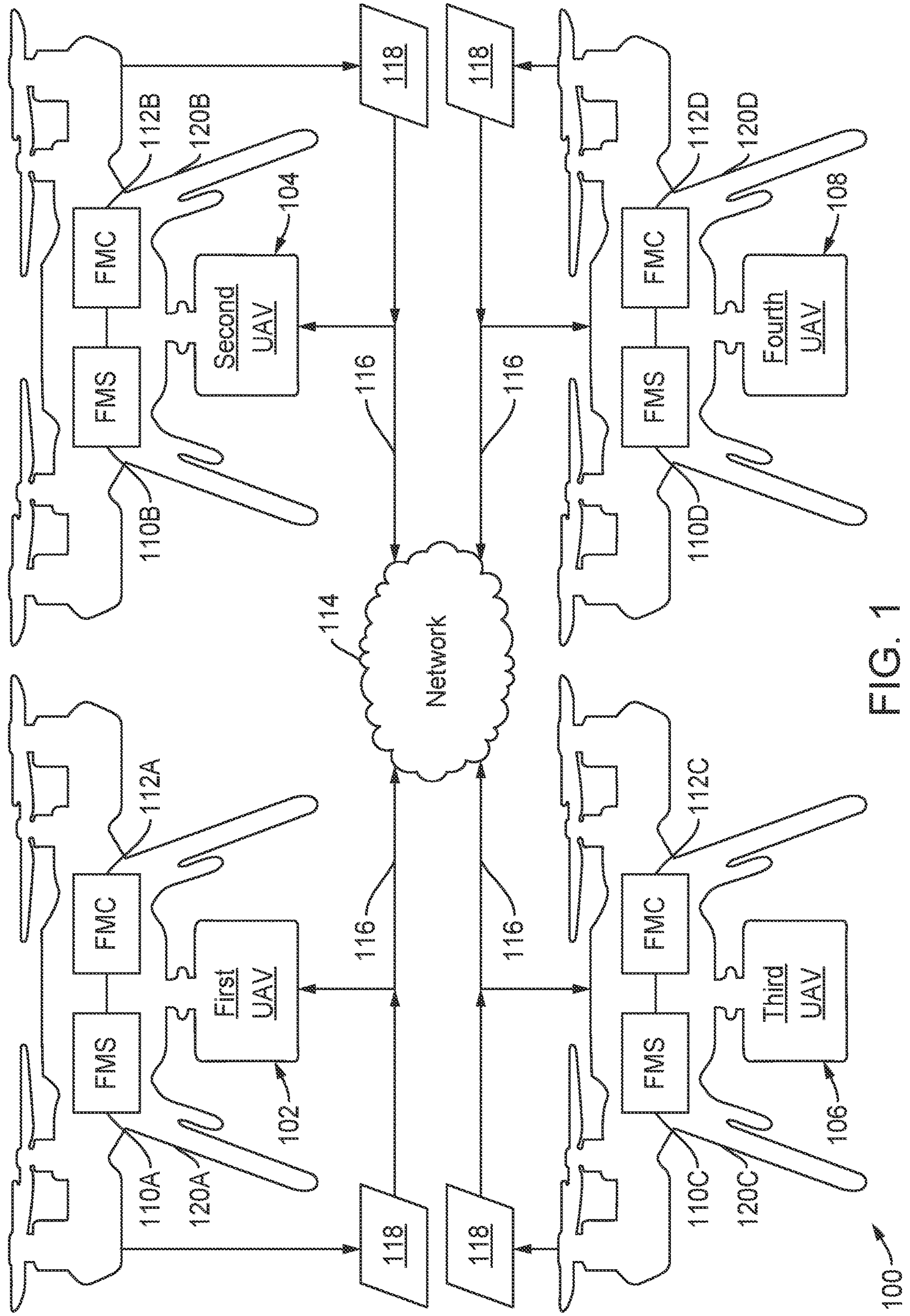
FIG. 1 illustrates a system of a plurality of UAVs according to the disclosed embodiments.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of the embodiments of the inventive concepts, numerous specific details are set forth in order to provide a more thorough understanding of the inventive concepts. It will be apparent to one skilled in the art, however, having the benefit of the instant disclosure that the inventive concepts disclosed herein may be practiced without these specific details.

As used herein, a letter following a reference numeral is intended to reference an embodiment of the feature or element that may be similar, but not necessarily identical, to a previously described element or feature bearing the same reference numeral, such as 1, 1a, or 1b. Such shorthand notations are used for purposes of convenience only, and should not be construed to limit the inventive concepts disclosed herein in any way unless expressly stated to the contrary.

Moreover, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes plural unless it is obvious that it is meant otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

As used herein, any reference to "one embodiment," "alternative embodiments," or "some embodiments" means that particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features that may not necessarily be expressly described or inherently present in the instant disclosure.

The inventive concepts may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

Inventive concepts may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed below.

The disclosed embodiments include a microservices architecture built with cloud or edge technologies to distribute flight management functionality across multiple platforms along with a score-based decision-making process for allocating requests based on multiple factors, such as importance, complexity, and available resources. The disclosed embodiments distribute the FMS functionality across computer nodes and vehicles platforms, as opposed to using local, onboard resources in a centralized manner. These features take advantage of the cloud or edge infrastructure to provide additional resiliency, robustness, and a more efficient deployment.

The FMS according to the disclosed embodiments may be adaptable to a wide range of processing architectures. Further, distribution and optimization of flight management functions may occur between platforms based on available resources and problem complexity. A pluggable architecture allows for different and arbitrary FMS functionality to be included using client libraries without significant refactoring of existing platforms and software.

Heterogeneous platforms may not have local access to important information such as avoidances. Low SWaP platforms may not have the computational resources to generate complicated routes or reroutes. The disclosed embodiments overcome these challenges by providing a collection of containerized cloud or edge services. Clients interact with an FMS application programming interface (API) to provide information and make requests. Third party FMS functionality as a client to internal services also is provided. The disclosed embodiments also include inter-application communication for distributing workloads.

Using score-based decision-making, a route manager within the FMS uses avoidance importance scores to trigger reroute requests. A rerouter within the FMS uses route complexity scores to perform one of two actions. One action is using the local rerouting client to reroute using local resources. The other action is requesting the reroute from another instance of an FMS with more resources. The score-based decision-making process makes headway toward solving decision allocation problems, such as determining what is the best set of resources upon which to generate a solution.

FIG. 1 depicts a system 100 of a plurality of UAVs according to the disclosed embodiments. An example of a UAV is disclosed by FIG. 2. The plurality of UAVs includes first UAV 102, second UAV 104, third UAV 106, and fourth UAV 108. Additional UAVs may be included in system 100. UAVs 102, 104, 106, and 108 may operate together as a unit, wherein the flight routes for the UAVs are coordinated so that the UAVs fly towards a common location. Alternatively, the UAVs may have individual flight routes based on instructions for the respective UAV.

The UAVs have housings to enclose the components within the respective UAV. First UAV 102 includes housing 120A. Second UAV 104 includes housing 120B. Third UAV 106 includes housing 120C. Fourth UAV 108 includes housing 120D. The housing for each UAV may be configured for aerodynamics. The housing may be made of any suitable material(s), such as graphite, carbon fiber, aluminum, metals, plastics, composites, or other materials.

Each UAV includes a flight management system (FMS) that acts to control flight routes and operations for the UAV. The FMS is an on-board multi-purpose navigation, performance, and vehicle operations computing device to provide data and synchronization between closed and open elements associated with flying the UAV from pre-flight start and take-off to landing and engine shut-down. The FMS may be linked to an array of on-board systems including navigation systems, the autopilot, and the auto-throttle. The FMS may control all phases of flight operations, including takeoff, routing, approach, and landing. Thus, first UAV 102 includes FMS 110A. Second UAV 104 includes FMS 110B. Third UAV includes FMS 110C. Fourth UAV includes FMS 110D.

The FMS components on the UAVs automate a variety of in-flight tasks, such as navigation and routing of the UAV. The FMS may include a flight management computer (FMC). An FMC is a computer system that uses a navigation database to allow routes to be pre-programmed and fed into the FMC by a data loader. The FMC is updated with UAV position by reference to available navigation aids. In some instances, the most appropriate aids automatically are selected during information updates. FMS 110A includes FMC 112A. FMS 110B includes FMC 112B. FMS 110C includes FMC 112C. FMS 110D includes FMC 112D.

UAVs 102, 104, 106, and 108 may communicate to each other via network 114. The UAVs may be connected to network 114 via connections 116. Connections 116 are wireless connections between the UAVs that allow them to exchange data 118. In some embodiments, the UAVs may communicate directly with each other instead of using network 114. For example, first UAV 102 and second UAV 104 may be in close proximity to each other so that data 118 is exchanged directly between the UAVs. Connections to network 114 do not need to be established.

UAVs 102, 104, 106, and 108 are configured to distribute flight management functionality. They also may perform distributed decision making. The UAVs may be considered platforms utilizing cloud or edge implementation that distribute and optimize flight management functions based on available resources within the UAVs and issue complexity.

Figure 2:
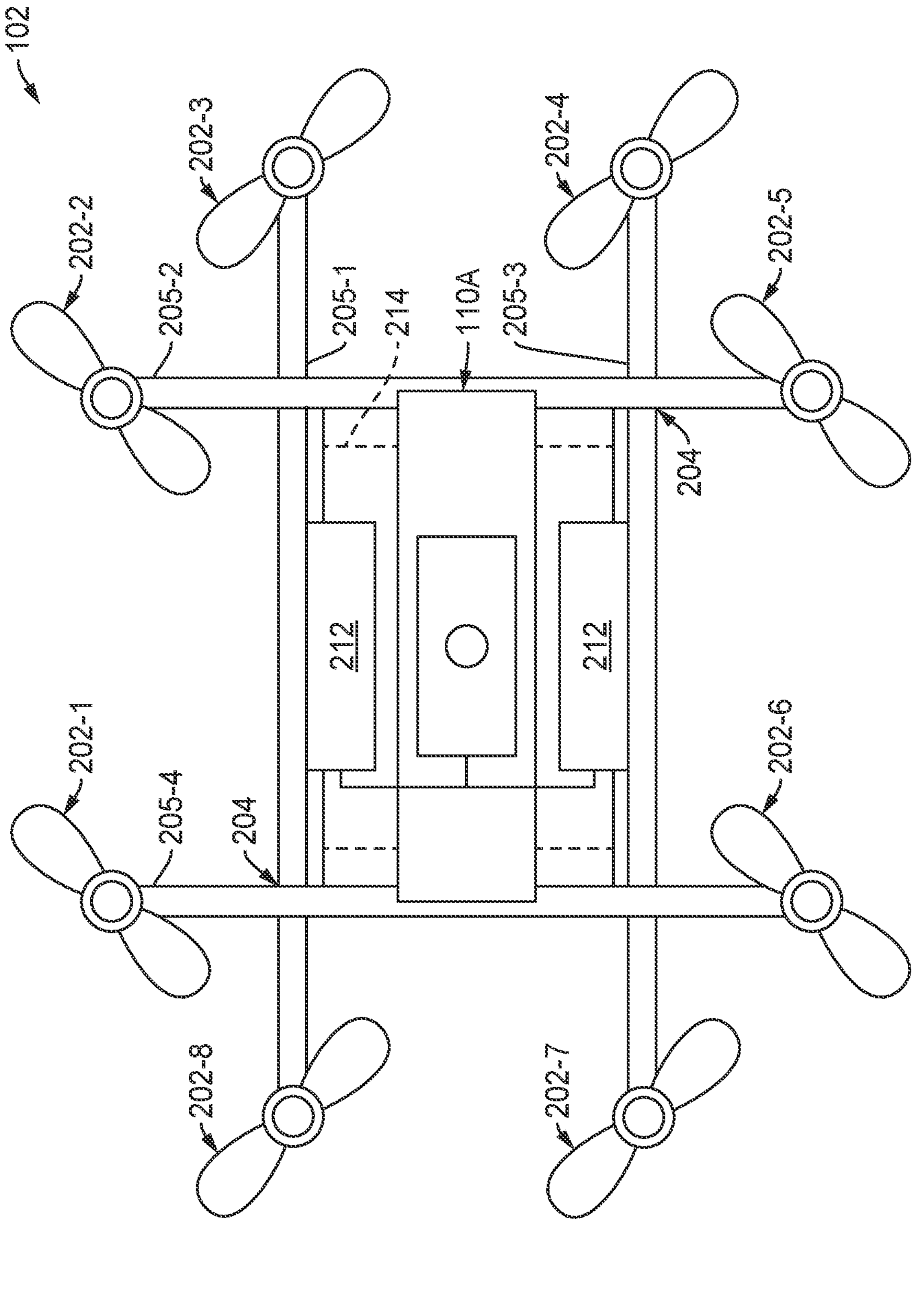
FIG. 2 illustrates a schematic diagram of a top-down view of a UAV according to the disclosed embodiments.

FIG. 2 depicts a schematic diagram of a top-down view of UAV 102 according to the disclosed embodiments. Although UAV 102 is shown, the features disclosed within FIG. 2 may be applicable to UAV 104, UAV 106, or UAV 108. Further, the UAVs may include other components not shown here for brevity.

UAV 102 includes propellers 202-1, 202-2, 202-3, 202-4, 202-5, 202-6, 202-7, and 202-8, spaced about frame 204. Propellers 202-1 to 202-8 may be any form of propeller, such as graphite, carbon fiber, and the like, and of a size sufficient to lift UAV 102 so that the UAV can navigate through the air to a location. While this example of UAV 102 includes eight propellers, in other embodiments, more or fewer propellers may be utilized. The propellers also may be positioned at different locations on UAV 102. Alternative methods of propulsion also may be used apart from propellers, such as fans, jets, and the like.

Frame 204 may be any suitable material, such as graphite, carbon fiber, aluminum, metals, plastic, composites, and the like. Frame 204 may include rigid members 205-1, 205-2, 205-3, and 205-4. The rigid members may act as beams arranged in a hash position with the rigid members intersecting and joined at approximately perpendicular angles. For example, rigid members 205-1 and 205-3 are arranged parallel to one another and are approximately the same length. Rigid members 205-2 and 205-4 are arranged parallel to one another, yet perpendicular to rigid members 205-1 and 205-3. Rigid members 205-2 and 205-4 are approximately the same length. In some embodiments, all of rigid members 205-1, 205-2, 205-3, and 205-4 are approximately the same length. Alternatively, the rigid members may be of different lengths. The spacing between the two sets of rigid members also may be approximately the same or different.

As disclosed above, UAV 102 includes housing 120A. Housing 120A may enclose FMS 110A, one or more rigid members 205-1 to 205-4, frame 204, and other components of UAV 102. Propellers 202-1 to 202-8 and their corresponding propeller motors are positioned at both ends of each rigid member. Rigid members 205-1 to 205-4 to which a propeller motor is mounted also may be referred to as a motor arm. The propeller motors may be any form of motor capable of generating enough speed with the propellers to lift UAV 102.

Mounted to frame 204 is FMS 110A, which may act as an aerial vehicle control system. Within UAV 102, FMS 110A is mounted in the middle and on top of frame 204. FMS 110A is disclosed in greater detail by FIG. 3. As noted above, FMS 110A controls the operation, routing, navigation, communication, and the like of UAV 102.

UAV 102 includes one or more power supplies 212. As shown in FIG. 2, UAV 102 includes two power supplies 212 that are removably mounted to frame 204. The power supply for UAV 102 may be in the form of battery power, solar power, gas power, super capacitor, fuel cell, alternative power generation source, or combinations thereof. Power supplies 212 may be coupled to and provide power for FMS 110A, the propeller motors, and other components of UAV 102.

UAV 102 may include inventory engagement mechanism 214. Inventory engagement mechanism 214 may be configured to engage and disengage items or containers from UAV 102. Inventory engagement mechanism 214 may be positioned within a cavity of frame 204 that is formed by the intersection of rigid members 205-1, 205-2, 205-3, and 205-4. In some embodiments, inventory engagement mechanism 214 may be positioned beneath FMS 110A.

Figure 3:
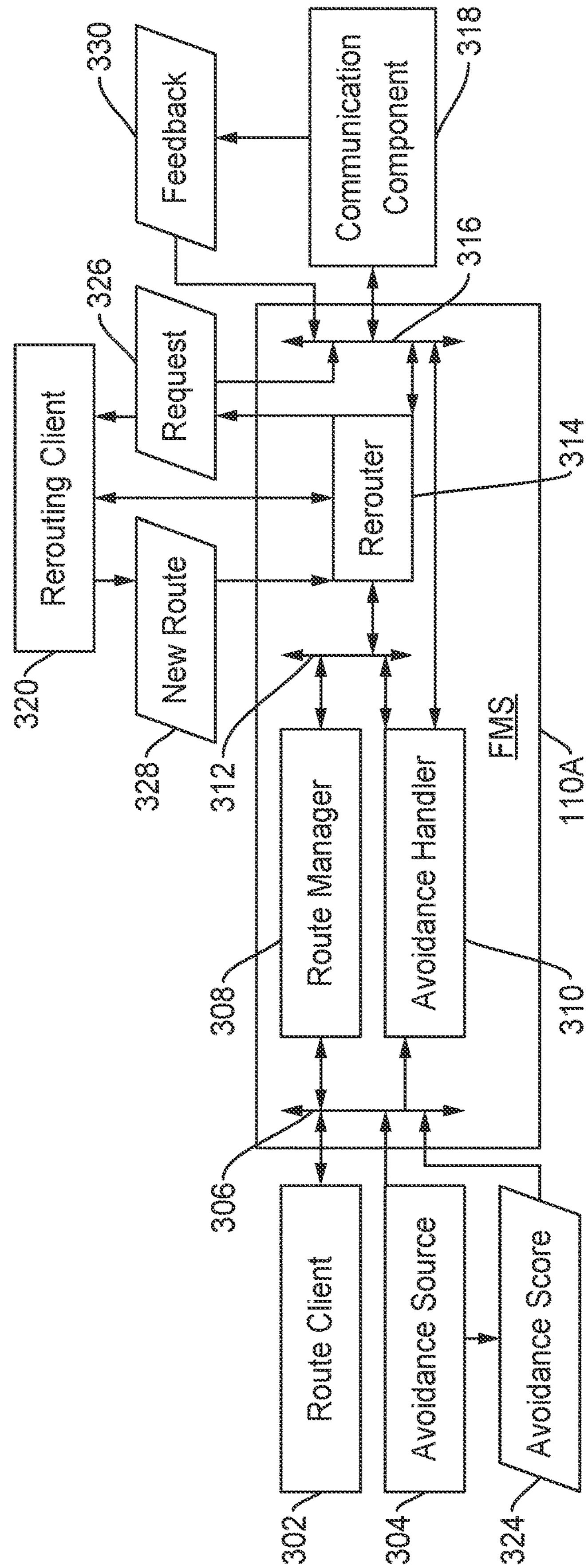
FIG. 3 illustrates depicts a block diagram of the components within a flight management system of a UAV according to the disclosed embodiments.

FIG. 3 depicts a block diagram of the components within FMS 110A according to the disclosed embodiments. FMS 110A may be connected to other components, or clients, within UAV 102 to exchange data. For example, FMS 110A may be connected to route client 302 and avoidance source 304. Route client 302 may be a client that exchanges information with FMS 110A using external bus 306. Route client 302 may be a navigation or pilot module that provides route information to UAV 102 and makes requests to route UAV 102 as needed. Route client 302 may query FMS 110A for route instructions or a reroute from a current route based on some criteria.

Avoidance source 304 also may be a client of FMS 110A that detects threats to UAV 102 or obstacles to be avoided. Avoidance source 304 may be a camera, radar, or other component to detect and track an object. Avoidance source 304 also may analyze a threat or obstacle to generate an avoidance importance score 324. Avoidance source 304 may assign this score based on the immediacy to avoid the threat or obstacle along with the detected capability of the threat or obstacle. For example, a missile emplacement will have a higher avoidance importance score 324 than a building in the distance. In some embodiments, more than one avoidance source 304 is connected to FMS 110A.

FMS 110A exchanges data with avoidance source 304 using external bus 306. External bus 306 may be connected to other subsystems within UAV 102. External bus 306 is connected to route manager 308 and avoidance handler 310 within FMS 110A, but also may be connected to other components.

FMS 110A includes route manager 308, avoidance handler 310, and rerouter 314. Route manager 308 may act as a decision maker within FMS 110A. Route manager 308 collects avoidances, scores, source type, and add weights, as disclosed below. It also may assign a complexity score to a reroute request 326 from route client 302. This feature allows route manager 308 to have a notion of the complexity of routes and the difficulty in implementing the route. Route manager 308 also may apply thresholds to scores to determine whether to reroute UAV 102. Route manager 308 may decide to reroute UAV 102 by taking in all the data and information available to FMS 110A. Route manager 308 may interact with clients outside FMS 110A, such as route client 302 and avoidance handler 304.

Avoidance handler 310 receives data and information from avoidance source 304 from external bus 306 and takes these to internal bus 312. Internal bus 312 allows route manager 308, avoidance handler 310, and rerouter 314 to communicate internally within FMS 110A. Avoidance handler 310 distributes avoidances to inter-application bus 316. Avoidance issues may be provided to other UAVs through inter-application bus 316 but this allows FMS 110A to at least note internally.

Rerouter 314 may stored the threshold for routing complexity based on environment resources. Rerouter 314 determines whether to send a reroute, or route adjustment, request 326 to a rerouting client 320 or to inter-application bus 316. If the route complexity score provided by route manager 308 for request 326 is below the complexity threshold, then rerouter 314 will forward request 326 to rerouting client 320. If the route complexity score is equal or above the complexity threshold, then rerouter 314 forwards request 326 to inter-application communication component 318 via inter-application bus 316.

Rerouting client 320 implements a rerouting function that inputs a route and route adjustment request 326. Rerouting client 320 then generates a new route 328 for UAV 102. Rerouting client 320 provides new route 328 back to rerouter 314 so that FMS 110A can then direct the navigation system of UAV 102 to take the new route to avoid the threat or obstacle detected by avoidance source 304. In some embodiments, rerouting client 320 has a 1-1 relationship with FMS 110A.

In some instances, the complexity for rerouting UAV 102 is too much for FMS 110A to process. For example, UAV 102 may not have local access to important information like avoidances. Another UAV may have access to this information. Further, FMS 110A may not have the processing resources to generate a complicated reroute or reroutes. Thus, FMS 110A can take advantage of the plurality of UAVs connected to UAV 102 to obtain this information or process the reroute request.

For these situations, FMS 110A forwards request 326 to inter-application communication component 318 along with avoidances associated with the request as provided by avoidance handler 310 to other platforms connected to UAV 102. Inter-application component 318 also receives feedback 330 from the other platforms and provides this to FMS 110A.

Feedback 330 may be information needed for rerouting client 320 to perform the rerouting, such as avoidance information not available to avoidance source 304. It also may be other avoidances detected by the other platforms that is used by rerouting client 320. Feedback 330 also may be the new route for UAV 102 as generated by another platform connected to UAV 102. Feedback 330 is provided to FMS 110A so that the flight management system may take further action without comprising the integrity of the reroute decision due to insufficient information or processing shortfalls.

Figure 4A:
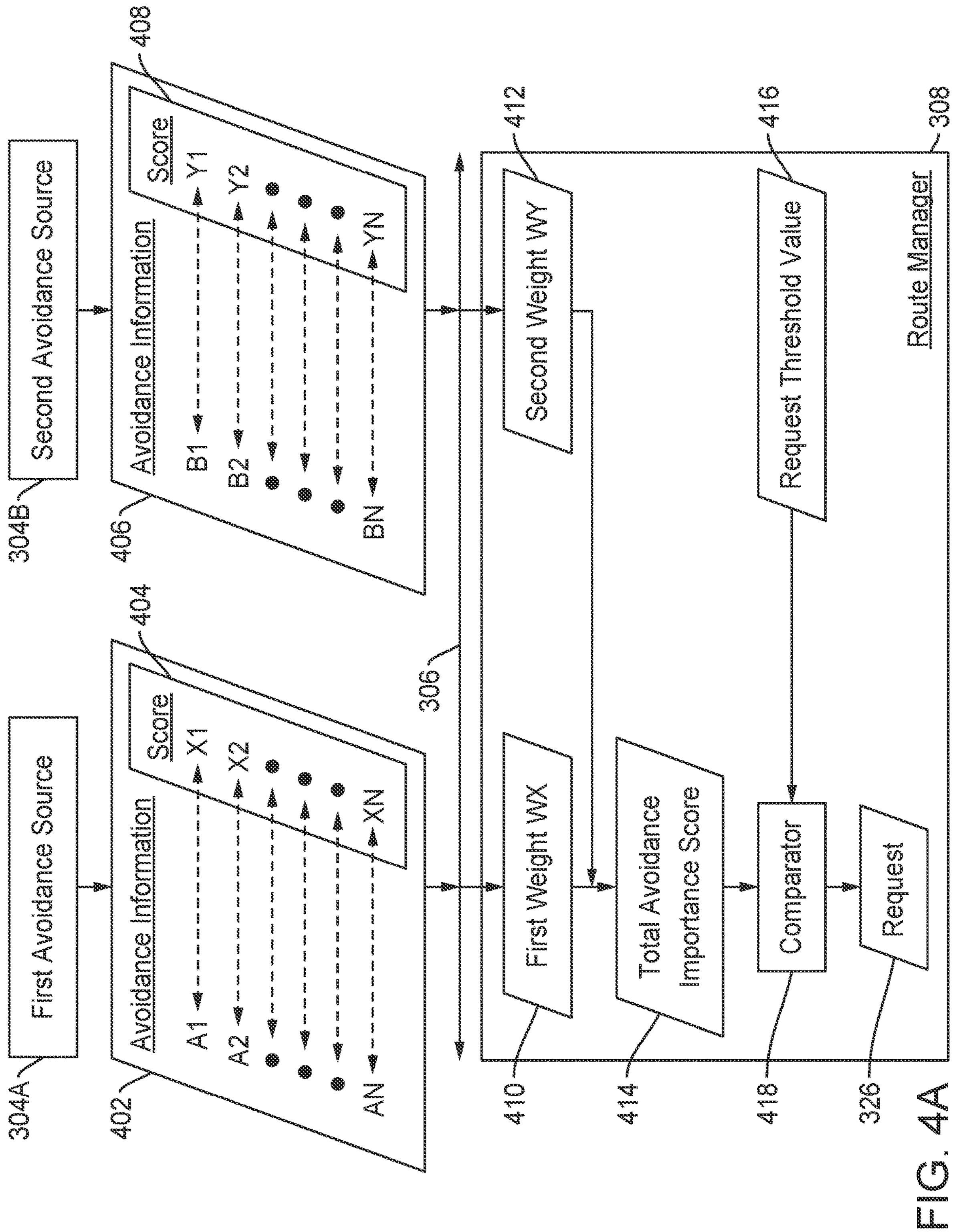
FIG. 4A illustrates a block diagram of the data flow in generating a route adjustment request according to the disclosed embodiments.

FIG. 4A depicts a block diagram of the data flow in generating route adjustment request 326 within route manager 308 according to the disclosed embodiments. First avoidance source 304A, second avoidance source 304B, and other additional avoidance sources provide data to route manager 308. Route manager 308 then determines when to generate route adjustment request 326.

First avoidance source 304A and second avoidance source 304B correspond to avoidance source 304, disclosed above. The avoidance sources may be client systems that provide data to and take instruction from FMS 110A. The avoidance sources may use a message data structure or an application programming interface (API) to communicate with FMS 110A. Incoming data for avoidances may be provided to external bus 306 then to route manager 308. First avoidance source 304A differs from second avoidance source 304B in terms of the type of data provided and overall purpose for UAV 102. For example, first avoidance source 304A may detect missile emplacements while second avoidance source 304B may detect weather.

First avoidance source 304A generates avoidance information 402. Avoidance information 402 may be provided over a time period such that different packets of information are received in order, such as information A1, information A2, and so on to information AN. Each packet of avoidance information 402 also includes a score 404. Scores may be determined based on the level of importance for the generated information and may vary for each piece of information. For example, information A1 has a score of X1, information A2 has a score of X2, and so on to information AN having a score of XN.

This relationship also exists for second avoidance source 304B. It generates avoidance information 406. For example, avoidance information 406 includes information B1, information B2, and so on to information BN. Each packet of avoidance information also includes a score 408, based on the level of importance for the generated information that varies for each piece of information. Thus, information B1 has a score of Y1, information B2 has a score of Y2, and so on to information BN having a score of YN.

As can be appreciated, information from different avoidance sources may have different levels of importance when it comes to rerouting UAV 102. The disclosed embodiments may assign weights to information as it is received by route manager 308. These weights may be assigned within route manager 308, as shown in FIG. 4A, or by the respective avoidance handler. Weights assigned to avoidance sources that are deemed more important in avoiding threats or obstacles are higher than avoidance sources that are not so important.

For example, first avoidance source 304A is deemed more important than second avoidance source 304B. Thus, first weight WX 410 is applied to scores 404 of information 402 received from first avoidance source 304A. First weight WX 410 is higher than second weight WY, which is applied to scores 408 of information 406 received from second avoidance source 304B. As route manager 308 monitors incoming information from the avoidance sources, more data or information from first avoidance source 304A will prompt generation of request 326 faster than data or information from second avoidance source 304B.

Route manager 308 includes a total avoidance importance score 414, or TAIS. Total avoidance importance score 414 is the aggregate scores of information provided by the avoidance sources. It starts at 0 and gradually increments as information is received by route manager 308. When a request 326 is generated, total avoidance importance score 414 is reset to 0 as a route adjustment request should avoid the threat or obstacle detected by UAV 102 as the UAV is directed to a new route.

Referring to FIG. 4A, as route manager 308 receives information 402 from first avoidance source 304A and information 406 from second avoidance source 304B, it multiplies scores 404 by first weight WX 410 and scores 408 by second weight WY 412. Route manager 308 adds the results of these operations to total avoidance importance score 414. Thus, the operations may have the following relationship $$TAIS=Current\ TAIS+(WX*X1)+(WX*X2)+\ldots(WX*XN)+(WY*Y1)+(WY*Y2)+\ldots(WY*YN), \quad \text{Equation 1}$$

wherein Current TAIS is the current total avoidance importance score when information 402 or information 406 is received.

Route manager 308 also includes a request threshold value 416, or Ta, that is used to determine when total avoidance importance score 414 has reached a level to generate request 326. In other words, the importance of the information provided by the avoidance sources as at a level that a route adjustment needs to be made. Request threshold value 416 may be set before UAV 102 commences operations. For example, if UAV 102 includes sensitive materials, then request threshold value 416 may be set lower than a UAV merely doing surveillance.

When TAIS>Ta, then route manager 308 generates request 326. This operation may be performed by comparator 418, as configured within route manager 308. Route manager 308 may monitor updates to total avoidance importance score 414 and compare any changes to the TAIS value to request threshold value 416. When it is determined a reroute is needed, route manager 308 generates request 326. Total avoidance importance score 414 is reset to zero, or TAIS=0.

Figure 4B:
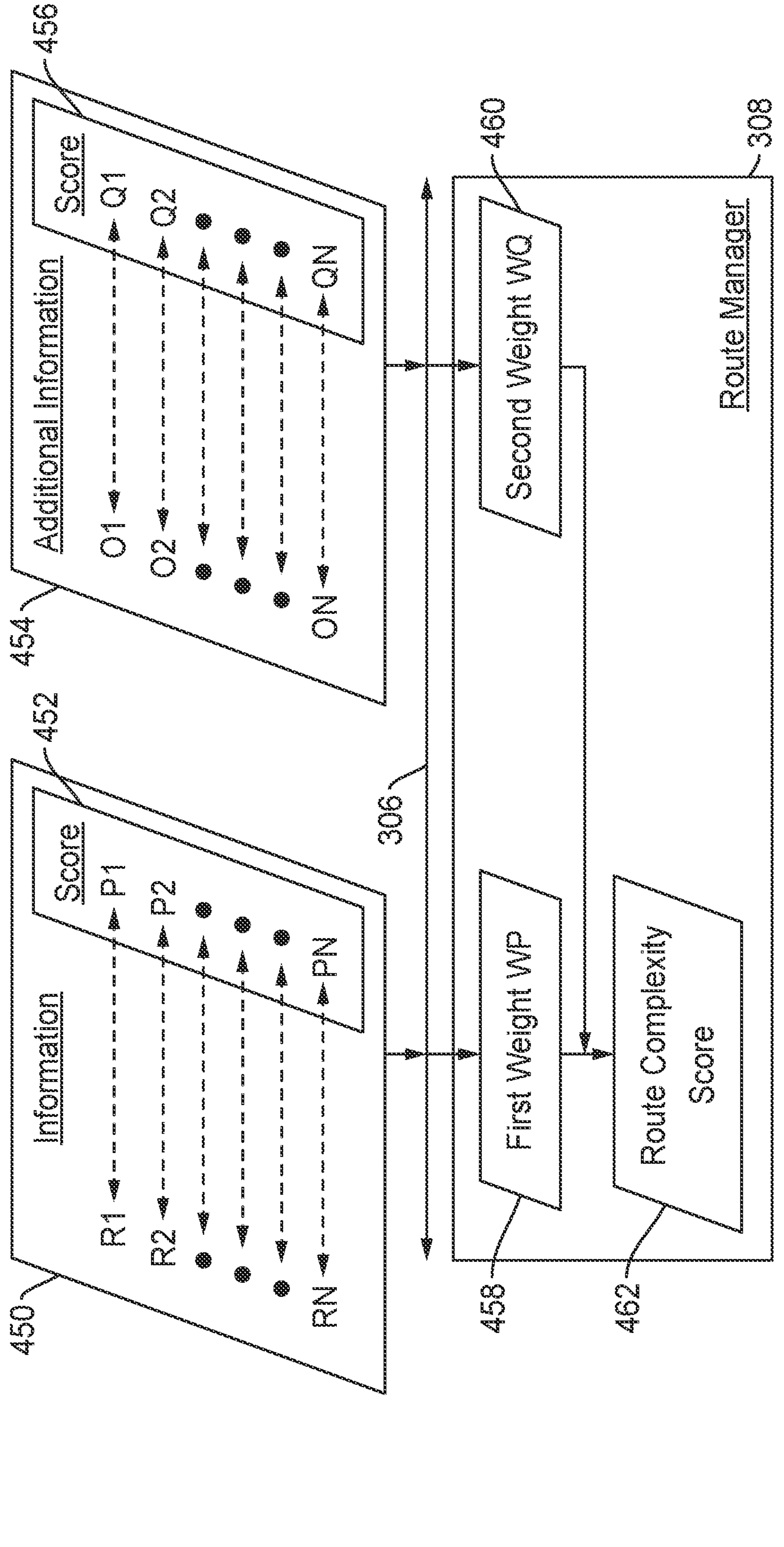
FIG. 4B illustrates a block diagram of the data flow in determining a route complexity score for a route adjustment request according to the disclosed embodiments.

FIG. 4B depicts a block diagram of the data flow in determining a route complexity score 462 for a route adjustment request 326 according to the disclosed embodiments. Route manager 308 also generates route complexity score 462 based on received data and information from components within UAV 102. Route complexity score 462 is provided with route adjustment request 326 to rerouter 314 and is used to determine how the request is handled.

Route manager 308 may generate route complexity score 462 similar to total avoidance importance score 414 in that it accumulates information and scores until request 326 is generated. The scores, however, are different. Total avoidance importance score 414 relates to how important the accumulated avoidances, through information 402 and 406, are, and whether they should trigger a route adjustment. Route complexity score 462 relates to how complex, or how difficult to calculate, a particular request 326 may be.

Information on the current route may be provided to route manager 308. This information may be provided from different components on UAV 102, such as route client 302 or avoidance source 304A or 304B. Other components also may provide information. Thus, information 450 is received having scores 452. Additional information 454 also may be received having scores 456. An example of such information may be the number of current waypoints in the current route, as provided by route client 302.

Information 450 may be separated by some criteria into information R1, information R2, and information R3. Using the above example, each information may be related to a waypoint in the current route. Each information also has an associated score for that piece of information. Information R1 has a score of P1, information R2 has a score of P2, and so on to information RN having a score of PN. This same relationship of information and scores may be found for additional information 454. Information O1 has a score of Q1, information O2 has a score of Q2, and so on to information ON having a score of QN.

As information 450 and additional information 454 are received by route manager 308, scores 452 and 456 are accumulated. The scores also may be associated with weights so that route complexity information that is more determinative of the complexity of a reroute is given greater importance within route complexity score 462. First weight WP 458 may be applied to scores 452. Second weight WQ 460 may be applied to scores 456. Much like Equation 1 for TAIS, route complexity score 462, or RCS, may be updated with the products of the scores and weights, or $$RCS=Current\ RCS+(WP*P1)+(WP*P2)+\ldots(WP*PN)+(WQ*Q1)+(WQ*Q2)+\ldots(WQ*QN), \quad \text{Equation 2}$$

wherein Current RCS is the current route complexity score when information 450 or additional information 454 is received.

When request 326 is generated by route manager 308, the current value for route complexity score 462 is determined. In some embodiments, route manager 308 may wait until request 326 is generated to capture information needed to determine route complexity. Alternatively, this information may be provided over time, much like information 402 and 406 for total avoidance importance score 414. Rerouter 314 then uses route complexity score 462 to determine whether to pass request 326 to rerouting client 320 or to inter-application communication component 318.

Figure 5:
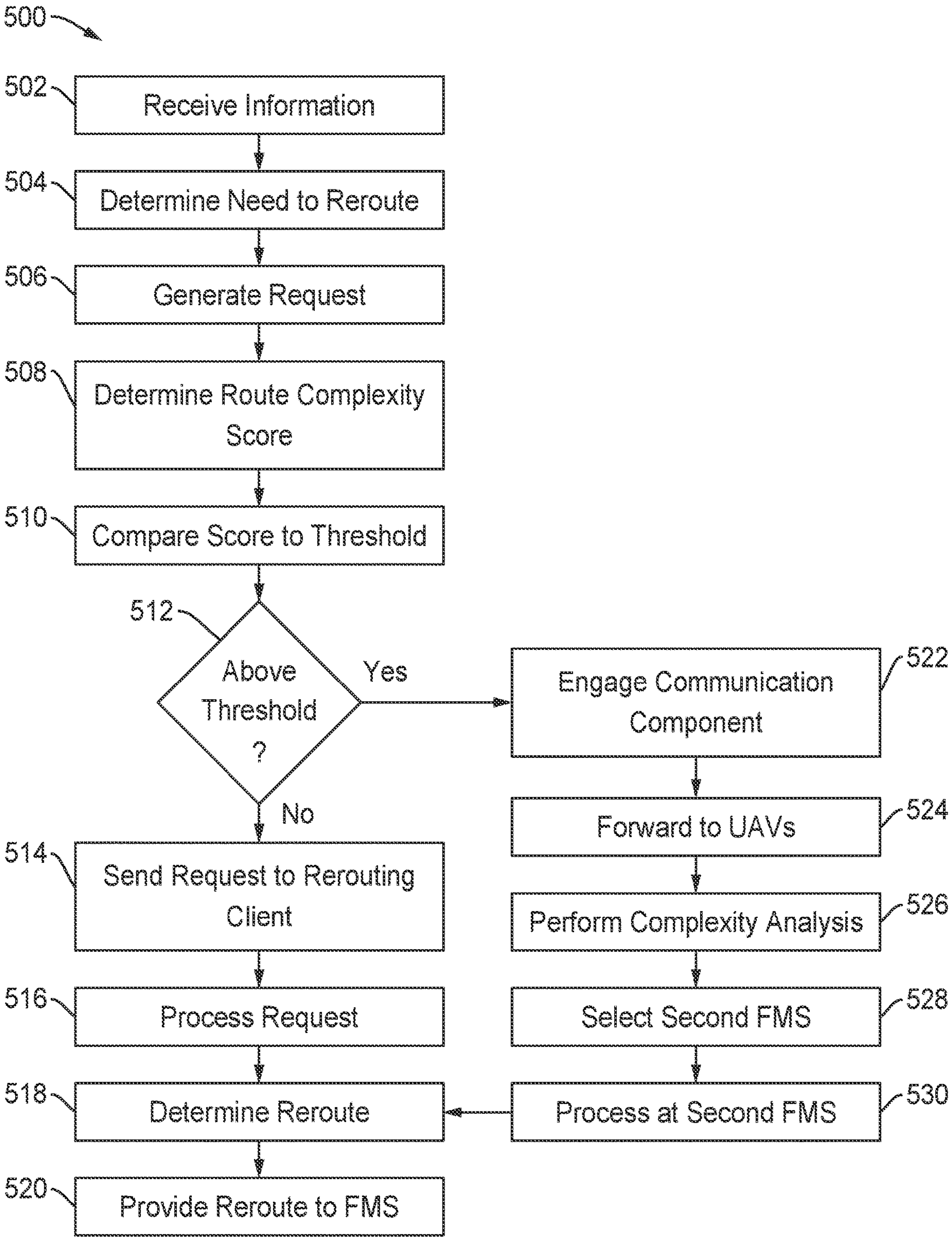
FIG. 5 illustrates a flowchart for processing a route adjustment request within a flight management system according to the disclosed embodiments.

FIG. 5 depicts a flowchart 500 for processing a route adjustment request 326 within FMS 110A according to the disclosed embodiments. Flowchart 500 may refer to FIGS.

1-4B for illustrative purposes. Flowchart 500, however, is not limited to the embodiments disclosed by FIGS. 1-4B. Flowchart 500 will refer to UAV 102 and FMS 110A, but may be applicable to other UAVs and FMSs.

Step 502 executes by receiving information from one or more avoidance source, such as information 402 from first avoidance source 304A and information 406 from second avoidance source 304B. Step 504 executes by determining a need to reroute UAV 102 based on the received information from the avoidance sources. This process is disclosed by FIG. 4A above. Using information 402 and related scores 404 plus information 404 and related scores 406, route manager 308 determines or updates total avoidance importance score 414 with the weighted scores. Once total avoidance importance score 414 is greater than request threshold value 416, route manager 308 determines a need exists to reroute UAV 102.

Step 506 executes by generating route adjustment request 326 by route manager 308 in response to the need to reroute. Step 508 executes by determining route complexity score 462 for request 326. The process for determining route complexity score 462 is disclosed by FIG. 4B above. Route complexity score 462 corresponds to how complex, or difficult a task, it is to process request 326. Route manager 308 forwards request 326 and route complexity score 462 to rerouter 314 within FMS 110A Step 510 executes by comparing route complexity score 462 to a total route complexity threshold, or Tr, for FMS 110A by rerouter 314. Complexity threshold Tr may be based on criteria related to the capabilities and resources of FMS 110A. For example, criteria may include processing capabilities based on processors available to rerouting client 320, memory storage capabilities, and the like. Complexity threshold Tr may be updated in rerouter 314 prior to UAV 102 engaging in operations along the designated route.

Step 512 executes by determining if route complexity score 462, or RCS disclosed above, is greater than or equal to complexity threshold Tr. If RCS<Tr, then rerouting client 320 can process request 326. If RCS>=Tr, then rerouting client 320 may not be able to process request 326 and FMS 110A should take advantage of the other UAVs accessible via communication component 318.

Thus, if step 512 is no, then step 514 executes by sending request 326 to rerouting client 320. Request 326 stays within the configuration of UAV 102. Step 516 executes by processing request 326 to determine a new or updated route for UAV 102. Step 518 executes by determining new route 328 for UAV 102. Step 520 executes by providing new route 328 to FMS 110A.

If step 512 is yes, then route complexity score 462 is equal or exceed complexity threshold Tr and request 326 may not be properly processed on UAV 102. Thus, step 522 executes by engaging inter-application communication component 318. Rerouter 314 provides request 326 via inter-application bus 316 to communication component 318. Avoidance handler 310 provides the avoidances from avoidance sources 304A and 304B to inter-application bus 316 as well. Avoidances may include information 402 and 406.

Step 524 executes by forwarding request 326 and avoidance information from communication component 318 to the respective communication components on platforms, or UAVs, connected to UAV 102. Referring to FIG. 1, request 326 and the avoidance information may be communicated to the communication components connected to FMS 110B in UAV 104, FMS 110C in UAV 106, and FMS 110D in UAV 108. In some embodiments, the UAVs may have an identification designation, such as an identification number, that indicates the respective UAV. These designations can signal to FMS 110A that a request 326 is from the local UAV or another UAV. If request 326 is from another UAV, then the disclosed embodiments may tag that request as going back to the identified UAV.

Step 526 executes by performing the same complexity analysis as performed by rerouter 314 of FMS 110A in the FMSs of the UAVs receiving the request in steps 510-512 above. The rerouters of the FMSs may compare the received route complexity score to their internal complexity thresholds to determine if the processing may be completed at the respective UAV. One difference in this step may be that the identification designation for the UAV indicates that it is from another platform, and not the local UAV. In step 510 above, FMS 110A may take into account that the request is not from the local UAV and act accordingly in the subsequent steps to transmit back to the requesting UAV.

Step 528 executes by selecting a second UAV to process the reroute request. Step 530 executes by processing request 326 at the second UAV. For example, UAV 104 may receive request 326 and route complexity score 462. Complexity threshold Tr for UAV 104 is higher than the one for UAV 102 because UAV 104 has greater processing capabilities, possibly through more processing hardware, than UAV 102. Route complexity score 462 is not greater than complexity threshold Tr for UAV 104. Thus, UAV 104 performs processing request 326 using its rerouting client 320.

Feedback 330 is generated by UAV 104. Flowchart 500 proceeds to steps 518 and 520 to determine new route 328 for UAV 102. Communication component 318 of UAV 104 provides new route 328 as feedback 330 to FMS 110A. FMS 110A and rerouting client 320 avoid any potential problems due to processing a complex reroute for UAV 102.

Feedback 330 also may include additional information from its avoidance sources 304. In some embodiments, rerouter 314 may be configured to request additional information from other platforms as opposed to sending request 326 to other platform. If route complexity score 462 exceeds complexity threshold Tr, then rerouter 314 may request information before making a final determination on whether to forward request 326 to other platforms. FMSs at the respective UAVs may provide information and scores along with feedback 330, or a separate route complexity score based on output from the respective route manager. Rerouter 314 may take into consideration feedback 330 from other UAVs.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product embodied in any tangible medium of expression having computer-usable program code embodied in the medium.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

The invention claimed is:

1. A method comprising:

determining an avoidance importance score by a route manager of a first flight management system for an unmanned aerial vehicle (UAV) for a need to reroute the UAV, wherein the avoidance importance score is based on data from an avoidance source;

generating a route adjustment request for the UAV from the route manager based on the avoidance importance score;

determining a route complexity score based on associated data for the route adjustment request within the first flight management system;

comparing the route complexity score to a complexity threshold for the first flight management system set in a rerouter of the first flight management system, wherein the complexity threshold is based on processing resources available to a rerouting client of the first flight management system; and based on the comparison, engaging an inter-application communication component connected to the first flight management system to forward the route adjustment request to a plurality of flight management systems over the network.

2. The method of claim 1, wherein the plurality of flight management systems includes a second flight management system to receive the route adjustment request from the first management system.

3. The method of claim 2, further comprising processing the route adjustment request at the second flight management system to determine at least one new route for the UAV of the first flight management system.

4. The method of claim 3, further comprising receiving the route adjustment request and the route complexity score at the inter-application communication component.

5. The method of claim 1, wherein the network includes a cloud infrastructure to communicate between the plurality of flight management systems.

6. The method of claim 1, wherein determining the avoidance importance score includes receiving the data from an avoidance source.

7. The method of claim 1, further comprising using the rerouting client to process the route adjustment request based on the comparison.

8. A system comprising:

a plurality of unmanned aerial vehicles (UAVs) connected to each other over a cloud network, wherein each UAV includes a flight management system configured to guide flight routes for the respective UAV;

the flight management system includes a route manager configured to retrieve data from an avoidance source and determine an avoidance importance score for a route adjustment request based on the data, wherein the route adjustment request results in at least one possible route for the respective UAV, and determine a route complexity score for the route adjustment request using associated data; and a rerouter configured to provide a complexity threshold and to receive the route adjustment request and the route complexity score, wherein the rerouter compares the route complexity score to the complexity threshold;

an inter-application communication component to transmit the route adjustment request if the route complexity score is greater than the complexity threshold; and a local rerouting client to process the route adjustment request if the route complexity score is below the complexity threshold, wherein the complexity threshold is set in the rerouter based on processing resources available to the local rerouting client.

9. The system of claim 8, wherein the flight management system includes an avoidance handler connected to the route manager to provide avoidance data from the avoidance source.

10. The system of claim 8, wherein the flight management system includes an inter-application channel to connect to the inter-application communication component.

11. The system of claim 8, wherein the flight management system is a first flight management system within the plurality of UAVs.

12. The system of claim 11, further comprising a second flight management system configured to receive the route adjustment request from the inter-application communication component.

13. The system of claim 12, wherein the second flight management system processes the route adjustment request to determine at least one new route for the UAV having the first flight management system.

14. The system of claim 13, wherein the second flight management system forwards the at least one new route to the first flight management system.

15. An unmanned aerial vehicle (UAV) comprising:

a flight management system that includes a route manager configured to retrieve data from an avoidance source and determine an avoidance importance score for a route adjustment request based on the data, wherein the route adjustment request results in at least one possible route for the respective UAV, and determine a route complexity score for the route adjustment request;

a rerouter configured to provide a complexity threshold and to receive the route adjustment request and the route complexity score, wherein the rerouter compares the route complexity score to the complexity threshold, and an internal channel to exchange the data between the route manager and the rerouter;

an inter-application communication component to transmit the route adjustment request if the complexity score is greater than the complexity threshold; and a local rerouting client to process the route adjustment request if the complexity score is below the complexity threshold, wherein the complexity threshold is set in the rerouter based on processing resources available to the local rerouting client.

16. The UAV of claim 15, wherein the flight management system includes an avoidance handler connected to the route manager to provide avoidance data from the avoidance source to determine the avoidance importance score.

17. The UAV of claim 15, wherein the flight management system includes an inter-application channel to connect to the inter-application communication component.

18. The UAV of claim 15, wherein the avoidance source is a camera connected to flight management system.

19. The UAV of claim 15, further comprising a route client to provide associated data to the route manager for determining the route complexity score.

20. The UAV of claim 19, wherein the associated data includes a number of waypoints for a current route implemented by the flight management system.

* * * * *